United States Patent
Lee et al.

(10) Patent No.: US 8,913,106 B2
(45) Date of Patent: Dec. 16, 2014

(54) 3D DISPLAY APPARATUS AND 3D DISPLAY METHOD THEREOF

(75) Inventors: Jin-sung Lee, Suwon-si (KR); Ju-yong Chang, Seoul (KR); Jong-sul Min, Suwon-si (KR); Sung-jin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 230 days.

(21) Appl. No.: 13/312,149

(22) Filed: Dec. 6, 2011

(65) Prior Publication Data

US 2012/0139910 A1 Jun. 7, 2012

Related U.S. Application Data

(60) Provisional application No. 61/420,057, filed on Dec. 6, 2010.

(30) Foreign Application Priority Data

Feb. 8, 2011 (KR) ........................ 10-2011-0011137

(51) Int. Cl.
*H04N 13/04* (2006.01)
*G06T 19/20* (2011.01)
*H04N 13/00* (2006.01)

(52) U.S. Cl.
CPC .... *H04N 13/0022* (2013.01); *G06T 2219/2016* (2013.01); *G06T 19/20* (2013.01); *H04N 13/0055* (2013.01); *H04N 13/0029* (2013.01); *H04N 13/0066* (2013.01)
USPC .............................................. 348/51; 348/52

(58) Field of Classification Search
USPC ........... 348/51, 52, 42, 43; 386/200, 223, 230
See application file for complete search history.

(56) References Cited

U.S. PATENT DOCUMENTS

| | | | |
|---|---|---|---|
| 7,605,776 B2 | 10/2009 | Satoh et al. | |
| 2004/0223049 A1* | 11/2004 | Taniguchi et al. | 348/14.02 |
| 2006/0290778 A1 | 12/2006 | Kitaura et al. | |
| 2007/0257902 A1 | 11/2007 | Satoh et al. | |
| 2009/0135090 A1 | 5/2009 | Kim | |
| 2011/0102544 A1* | 5/2011 | Kim | 348/43 |

FOREIGN PATENT DOCUMENTS

| | | |
|---|---|---|
| JP | 2008-109267 A | 5/2008 |
| JP | 2008-109341 A | 5/2008 |
| KR | 10-2006-0023957 A | 3/2006 |
| KR | 10-2006-0087511 A | 8/2006 |
| KR | 1020060134309 A | 12/2006 |

OTHER PUBLICATIONS

Communication (PCT/ISA/210) dated May 1, 2012 issued by the International Searching Authority in counterpart Korean Application No. PCT/KR/2011/008493.

(Continued)

*Primary Examiner* — Robert Chevalier
(74) *Attorney, Agent, or Firm* — Sughrue Mion, PLLC

(57) ABSTRACT

A three-dimensional (3D) display apparatus and method controlling thereof are provided. The 3D display apparatus includes: a reception unit which receives a 3D image signal from another 3D display apparatus; a conversion unit which converts a disparity of the 3D image signal based on transmitter information of the other 3D display apparatus and receiver information of the 3D display apparatus, and generates an output 3D image signal having depth information which is proportional to depth information of the 3D image signal; and a display unit which outputs the output 3D image signal.

22 Claims, 6 Drawing Sheets

(56) References Cited

OTHER PUBLICATIONS

Communication (PCT/ISA/237) issued May 1, 2012 issued by the International Searching Authority in counterpart Korean Application No. PCT/KR/2011/008493.

Search Report issued by the European Patent Office in European Patent Application No. 11847128.3 dated Mar. 18, 2014.
Kai Ide et al Adaptive parallax for 3D television:, 3DTV Conference: the True Vision—Capture, Transmission and Display of 3D Video, IEEE, Jun. 7, 2010, pp. 1-4.

* cited by examiner

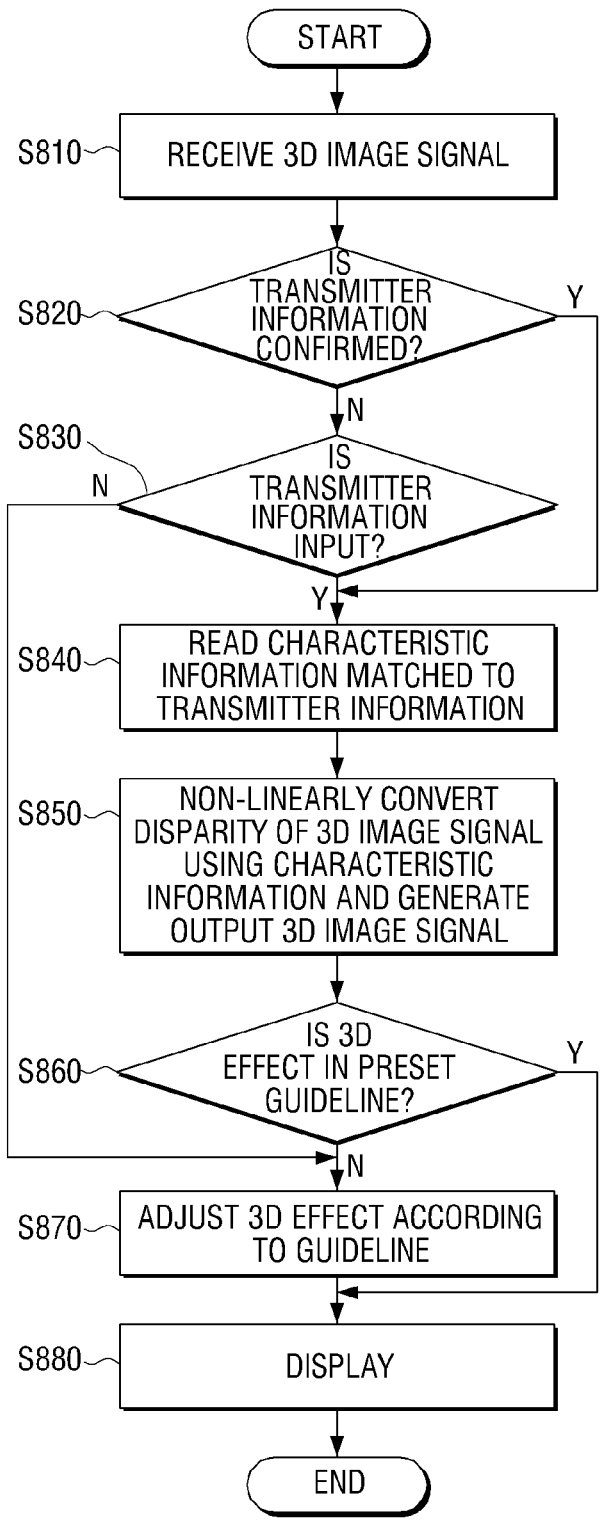

3D DISPLAY APPARATUS AND 3D DISPLAY METHOD THEREOF

CROSS-REFERENCE TO RELATED APPLICATION

This application claims priority from U.S. Provisional Application No. 61/420,057, filed on Dec. 6, 2010, and Korean Patent Application No. 10-2011-0011137, filed on Feb. 8, 2011 in the Korean Intellectual Property Office, the disclosures of which are incorporated herein by reference in their entirety.

BACKGROUND

1. Field

Apparatuses and methods consistent with exemplary embodiments relate to a three-dimensional (3D) display apparatus and a 3D display method thereof, and more particularly, to a 3D display apparatus and a 3D display method thereof which are capable of suitably converting and outputting 3D image signals provided from other 3D display apparatuses.

2. Description of the Related Art

In recent years, efforts to develop a 3D display apparatus have been continued to provide more realistic watch sensitivity. Thereby, it is possible to watch an existing 3D image signal which has mainly been watched in a theater using a related art display apparatus such as a television (TV) in a home.

Particularly, in recent years attempts have been made to output a 3D image signal even in a portable display apparatus having a relatively small size, such as a portable phone, a personal digital assistant (PDA), or a notebook. As a result, 3D image signals having various resolutions and sizes have been developed.

On the other hand, there is a case where users want to watch a 3D image signal, which has been watched through a portable display apparatus such as their mobile phones, through a large-scale display apparatus such as a TV. Thus, a function to share a 3D content between apparatuses, that is, the 3D image signal, may be provided.

However, when a characteristic of an apparatus for transmitting a 3D image signal differs from that of an apparatus for receiving a 3D signal, it is difficult to watch a normal 3D image signal. That is, when a user wants to watch the 3D image signal, which has been watched in a portable display apparatus having a relatively a small size, through a large-scale display apparatus such as a TV, a process of converting an image size in horizontal and vertical directions according to a display size thereof must be performed. In this case, distortion of an original 3D effect may occur in the conversion process.

Further, when a disparity of the 3D image signal is adjusted by considering only the display size, since the 3D image has an excessive depth, a user may feel tired in watching the 3D image signal.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

According to an aspect of an exemplary embodiment, there is provided a 3D display apparatus which communicates with another 3D display apparatus, including: a reception unit which receives a 3D image signal from the other 3D display apparatus; a conversion unit which converts a disparity of the 3D image signal based on transmitter information of the other 3D display apparatus and receiver information of the 3D display apparatus, and generates an output 3D image signal having depth information which is proportional to depth information of the 3D image signal; and a display unit which outputs the output 3D image signal.

The conversion unit may detect the transmitter information from the 3D image signal.

The transmitter information may include additional information transmitted from one of the other 3D display apparatus and an external apparatus.

The transmitter information may include information for at least one of a kind, a product name, a resolution, a display size and a viewing distance of the other 3D display apparatus.

The 3D display apparatus may further include: an input unit which inputs the transmitter information; and a storage unit which stores the receiver information and other information including information for a resolution, a display size and a viewing distance, wherein the conversion unit reads from the storage unit the receiver information and the other information and converts the 3D image signal based on the receiver information and the other information read from the storage unit.

The 3D display apparatus may further include a storage unit which stores information for a preset guideline, wherein the conversion unit adjusts a 3D effect of the output 3D image signal according to the preset guideline if the depth information of the output 3D image signal deviates from the preset guideline.

The 3D display apparatus may further include a storage unit which stores information for a preset guideline, wherein the conversion unit adjusts a 3D effect of the 3D image signal according to the preset guideline and generates the output 3D image signal if the transmitter information of the other 3D display apparatus is not confirmed.

The conversion unit may calculate a disparity of the output 3D image signal according to a first equation:

$$T_2 = b\left(1 - \frac{f_2}{a} \cdot \frac{b - T_1}{bf_1}\right),$$

and wherein the conversion unit may calculate the depth information D2 of the output 3D image signal based on the calculated disparity of the output 3D image signal and according to a second equation:

$$D_2 = \frac{bf_2}{b - T_2},$$

and wherein "b" denotes a preset interocular distance of a user, "a" denotes a preset proportionality constant between the depth information of the 3D image signal and the depth information of the output 3D image signal, "f1" denotes a preset first viewing distance to a screen of the other 3D display apparatus, "f2" denotes a preset second viewing distance to a screen of the 3D display apparatus, T1 denotes the disparity of the 3D image signal, and T2 denotes a disparity of the output 3D image signal.

The conversion unit may read the depth information of the output 3D image signal from a look-up table, wherein the depth information of the output 3D image signal is calculated according to equations:

$$T_2 = b\left(1 - \frac{f_2}{a} \cdot \frac{b - T_1}{bf_1}\right) \text{ and}$$

$$D_2 = \frac{bf_2}{b - T_2},$$

and may generate the output 3D image signal based on the depth information D2 read from the look-up table, wherein, "b" denotes a preset interocular distance of a user, "a" denotes a preset proportionality constant between the depth information of the 3D image signal and the depth information of the output 3D image signal, f1 denotes a preset first viewing distance to a screen of the other 3D display apparatus, f2 denotes a preset second viewing distance to a screen of the 3D display apparatus, T1 denotes the disparity of the 3D image signal, and T2 denotes a disparity of the output 3D image signal.

According to an aspect of another exemplary embodiment, there is provided a 3D display method of controlling a 3D display apparatus which communicates with another 3D display apparatus, the method including: receiving a 3D image signal from the other 3D display apparatus; converting a disparity of the 3D image signal using transmitter information of the other 3D display apparatus and receiver information of the 3D display apparatus; generating an output 3D image signal having depth information proportional to depth information of the 3D image signal; and outputting the output 3D image signal.

The method may further include detecting the transmitter information from the 3D image signal.

The transmitter information may include additional information transmitted from one of the other 3D display apparatus and an external apparatus.

The transmitter information may include information for at least one of a kind, a product number, a product name, a resolution, a display size and a viewing distance of the other 3D display apparatus.

The method may further include: inputting the transmitter information; and reading from a storage unit the receiver information and other information including information for a resolution, a display size, and a viewing distance matched to the input transmitter information, wherein the generating of the output 3D image signal includes converting the disparity of the 3D image signal based on the receiver information and the other information read from the storage unit.

If the depth information of the output 3D image signal deviates from a preset guideline, the method may further include adjusting a 3D effect of the output 3D image signal according to the preset guideline.

If the transmitter information of the other 3D display apparatus is not confirmed, the method may further include adjusting a 3D effect of the 3D image signal according to the preset guideline.

The generating the output 3D image signal may include calculating the disparity of the output 3D image signal based on a first equation $$T_2 = b\left(1 - \frac{f_2}{a} \cdot \frac{b - T_1}{bf_1}\right)$$

and calculating the depth information D2 of the output 3D image signal according to a second equation:

$$D_2 = \frac{bf_2}{b - T_2},$$

and wherein "b" denotes a preset interocular distance of a user, "a" denotes a preset proportionality constant between the depth information of the 3D image signal and the depth information of the output 3D image signal, f1 denotes a preset first viewing distance to a screen of the other 3D display apparatus, f2 denotes a preset second viewing distance to a screen of the 3D display apparatus, T1 denotes the disparity of the 3D image signal, and T2 denotes the disparity of the output 3D image signal.

The generating the output 3D image signal may include reading the depth information of the output 3D image signal from a look-up table, wherein the depth information of the output 3D image signal is calculated according to equations $$T_2 = b\left(1 - \frac{f_2}{a} \cdot \frac{b - T_1}{bf_1}\right) \text{ and}$$

$$D_2 = \frac{bf_2}{b - T_2},$$

and generating the output 3D image signal based on the depth information of the output 3D image signal read from the look-up table, wherein "b" denotes a preset interocular distance of a user, "a" denotes a preset proportionality constant between the depth information of the 3D image signal and the depth information of the output 3D image signal, f1 denotes a preset first viewing distance to a screen of the other 3D display apparatus, f2 denotes a preset second viewing distance to a screen of the 3D display apparatus, T1 denotes the disparity of the 3D image signal, and T2 denotes the disparity of the output 3D image signal.

The method may further include calculating the disparity of the output 3D image signal according to a non-linear relationship between the depth information of the output 3D image signal and a viewing distance to a screen of the 3D display apparatus.

According to an exemplary embodiment, there is provided a 3D display apparatus, which communicates with another 3D display apparatus, the 3D display apparatus including: a reception unit which receives a 3D image signal from the other 3D display apparatus; a conversion unit which calculates a disparity of an output 3D image signal based on a disparity of the received 3D image signal, depth information of the received 3D image signal and a viewing distance to a screen of the other 3D display apparatus, and generates the output 3D image signal; and a display unit which outputs the output 3D image signal.

The disparity of the output 3D image signal may be further calculated based on an interocular distance of a user.

BRIEF DESCRIPTION OF THE DRAWING FIGURES

The above and/or other aspects will be more apparent by describing in detail exemplary embodiments, with reference to the accompanying drawings, in which:

FIGS. 7 and 8 are flowcharts illustrating 3D display methods according to various exemplary embodiments.

DETAILED DESCRIPTION OF EXEMPLARY EMBODIMENTS

Figure 1:
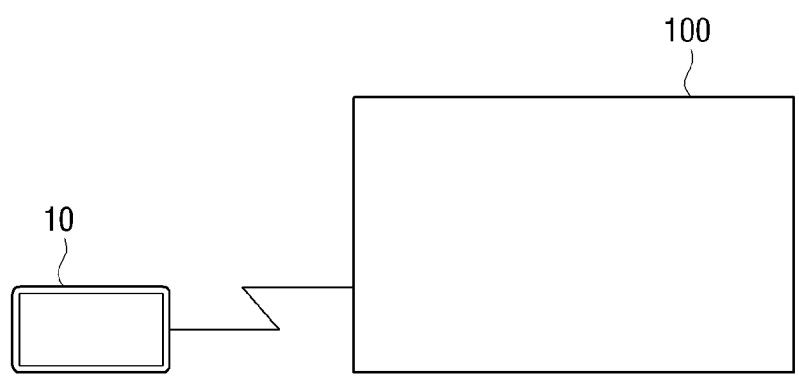
FIG. 1 is a view illustrating a method of sharing a 3D image signal between 3D display apparatuses according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating a method of sharing a 3D image signal according to an exemplary embodiment.

Referring to FIG. 1, a 3D display apparatus 100 may receive a 3D image signal from another 3D display apparatus 10. For clarity, the other display apparatus 10 may be referred to as a first 3D display apparatus and the 3D display apparatus 100 may be referred to as a second 3D display apparatus. Further, the 3D image signal may be a stereo image. The stereo image may include two images capturing one subject at different angles, that is, a left-eye image and a right-eye image.

FIG. 1 illustrates a mobile phone as the first 3D display apparatus 10 and a television (TV) as the second 3D display apparatus 100, but the present inventive concept is not limited thereto. For example, the mobile phone may be used as the second 3D display apparatus 100 and the TV may be used as the first 3D display apparatus 10. Further, each of the first and second 3D display apparatuses 10 and 100 may be embodied in various display apparatuses such as a personal computer (PC), a laptop computer, an electronic frame, an electronic book, a personal digital assistance (PDA), an electronic notebook, an MP3 player other than a TV and a mobile phone, etc.

Referring to FIG. 1, a user may transmit a 3D image signal being output from or stored in the first 3D display apparatus 10 to the second 3D display apparatus 100. Specifically, the user can connect the first and second 3D display apparatuses 10 and 100 to each other using a wired interface such as a universal serial bus (USB) cable, or various wireless interface standards, and share the 3D signal by inputting an information transmission command on the first 3D display apparatus 10 or the second 3D display apparatus 100.

The 3D image signal provided from the first 3D display apparatus 10 is a signal generated according to apparatus characteristic of the first 3D display apparatus. When the apparatus characteristic of the first 3D display apparatus 10, such as a display size, a resolution, a viewing distance to a display screen of the first 3D display apparatus 10, etc., is different from an apparatus characteristic of the second 3D apparatus 100, the second 3D display apparatus 100 should convert the 3D image signal provided from the first 3D display apparatus 10 according to the apparatus characteristic of the second 3D apparatus 100, and then output the converted 3D image signal.

A correlation between a disparity and an actual distance in the image signal has a non-linear characteristic. Therefore, when the disparity is linearly converted using an image interpolation method, a 3D effect due to the converted disparity is non-linearly converted. Therefore, when an output 3D image signal in which the disparity is linearly converted through an image interpolation method is output from the second 3D display apparatus 100, an original 3D effect is distorted.

Thereby, the second 3D display apparatus 100 converts the 3D image signal using a relational function between the disparity and the distance to cause the original 3D effect to be maintained, and generates the output 3D image signal.

Specifically, the second 3D display apparatus 100 non-linearly converts the disparity of the 3D image signal using transmitter information of the first 3D display apparatus which transmits the 3D image signal and receiver information of the second 3D display apparatus which receives the 3D image signal. In this case, since the disparity and the distance have the non-linear relationship, depth information of the 3D image signal is linearly converted. Therefore, the second 3D display apparatus 100 may generate the output 3D image signal having depth information in linear-proportional to the depth information of the 3D image signal.

Although the method of processing the 3D image signal received from the other 3D display apparatus 10 has been described as above, the second 3D display apparatus 100 which is a reception side apparatus may not necessarily receive a 3D image signal only from a 3D display apparatus. That is, even when a 3D image signal which is converted according to different apparatus information is provided from an external apparatus such as a different type apparatus or a recording medium, the second 3D display apparatus 100 may non-linearly convert a disparity of the 3D image signal and generate an output 3D image signal in which depth information is linear-proportionally adjusted according to its apparatus information. That is, even when a 3D image signal is transmitted from a 3D display apparatus which is a basis for generation of the 3D image signal or the 3D image signal is transmitted through other storage mediums or other sources, the conversion is performed by considering a difference between an apparatus characteristic of the 3D display apparatus and an apparatus characteristic of a 3D display apparatus for outputting the 3D image signal. Hereinafter, for clarity, the embodiments will be described based on sharing the signal between 3D display apparatuses. Thus, its own apparatus information of a transmission side 3D display apparatus may be used in a reception side 3D display apparatus.

Figure 2:
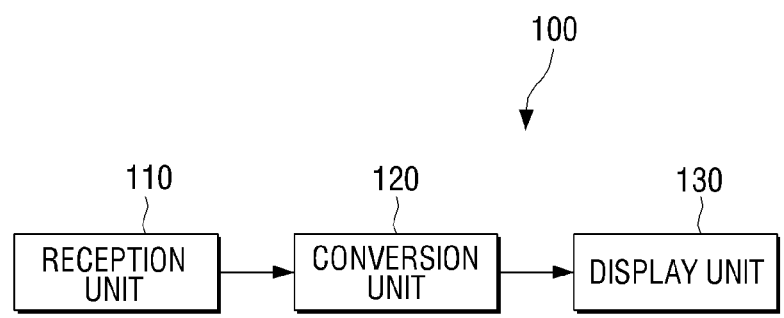
FIG. 2 is a block diagram illustrating a configuration of a 3D display apparatus according to an exemplary embodiment.

FIG. 2 is a block diagram illustrating a configuration of a 3D display apparatus according to an exemplary embodiment. In FIG. 2, the 3D display apparatus is referred to as a reception side 3D display apparatus which receives and output a 3D image signal. Referring to FIG. 2, the 3D display apparatus 100 includes a reception unit 110, a conversion unit 120, and a display unit 130.

The reception unit 110 receives the 3D image signal. In this case, the reception unit 110 may receive the 3D image signal from another 3D display apparatus as described above. Alternatively, the reception unit 110 may receive the 3D image signal from a recording medium, a broadcasting station, or various external apparatuses such a web server.

The received 3D image signal has a depth map generated according to specific apparatus information. The depth map denotes that a variation state of a depth is configured as one image. Here, the depth denotes information indicating a degree of a 3D effect such as a distance between a subject and a camera or a distance between the subject and a recording medium (for example, a film) in which an image of the subject is formed. That is, it is seen that as a distance between points corresponding to a left-eye image and a right-eye image is large, the 3D effect can be more increased. The depth map is a map in which the variation state of the depth is configured as one image and may be represented as a gray level which is varied according to a distance between points matched to each other in the left-eye image and the right-eye image.

The conversion unit 120 non-linearly converts the disparity of the 3D image signal using the transmitter information of the other 3D display apparatus and the receiver information of the 3D display apparatus. Therefore, the conversion unit 120 may generate the output 3D image signal having the depth information in linear-proportional to the depth information of the 3D image signal. On the other hand, as described above, when the 3D image signal is not received from the other 3D display apparatus, the conversion unit 120 may also perform conversion of the 3D image signal using apparatus information of an available apparatus and the receiver information of the 3D display apparatus.

The display unit 130 displays the output 3D image signal converted in the conversion unit 120. Specifically, the display unit 130 alternatively displays a left-eye image and a right-eye image by a preset number of times. Thereby, a user may watch the 3D image signal that the original 3D effect is maintained as much as possible while the 3D image signal is converted according to a display characteristic of a new 3D display apparatus.

Figure 3:
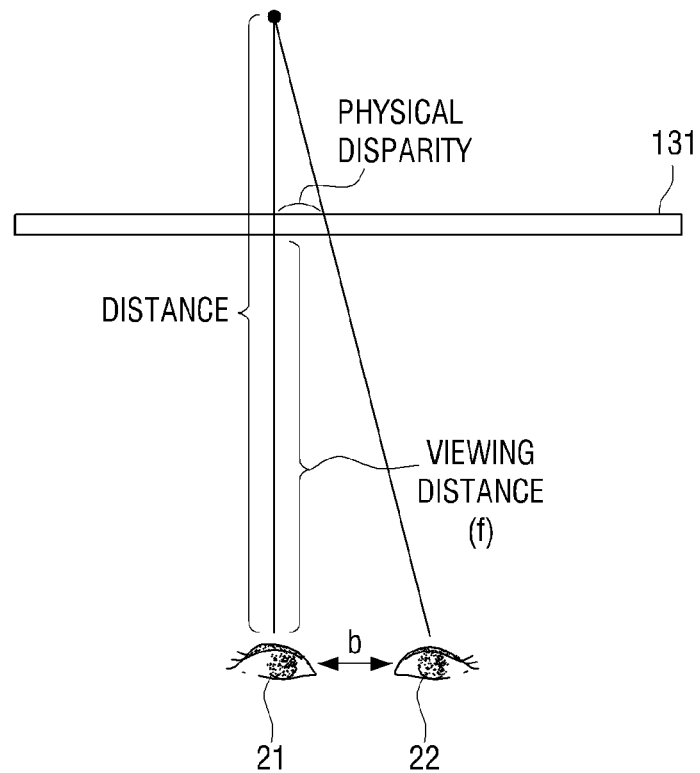
FIGS. 3 and 4 are views a relationship between a distance and a disparity.
Figure 4:
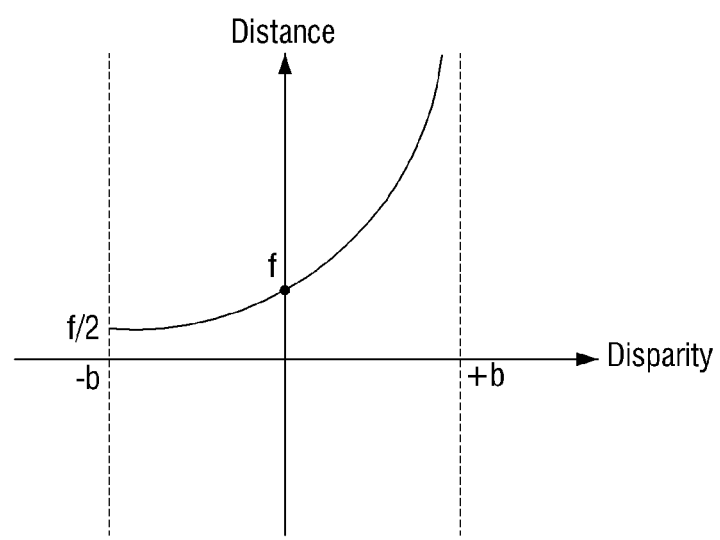

FIGS. 3 and 4 are views explaining the relationship between a distance and a disparity.

Referring to FIG. 3, a user who is away from a display screen 131 of the display unit 130 by a viewing distance f watches the display screen 131 using both eyes 21 and 22. In this case, although a distance between the both eyes 21 and 22, that is, an interocular distance is slightly different from each person, the interocular distance may be set to a specific value b on the basis of a measuring result of interocular distances of average users. Further, a distance from the display screen 131 to the user, that is, the viewing distance f may be set by considering a kind or a display size of a corresponding 3D display apparatus. For example, in the case of a small-size portable apparatus such as a mobile phone, the viewing distance f may be set to about 20 cm to 40 cm. On the contrary, in the case of a relatively large-size apparatus such as a TV, the viewing distance f may be set to about 2 m to 3 m. Further, a distance between points on the display screen 131 viewed by the both eyes 21 and 22, that is, a physical disparity may be calculated as the following Equation.

Physical disparity=Pixel disparity*display size/resolution (Equation 1)

When the viewing distance, the interocular distance, the distance, and the disparity are set as shown in FIG. 3, the relationship between the disparity and the distance may be expressed as the following Equation.

$$\text{Distance} = \frac{bf}{b\text{-Disparity}} \quad \text{(Equation 2)}$$

FIG. 4 is a graph expressing Equation 2.

Referring to FIG. 4, it is seen that the relationship between the disparity and the distance is non-linear. Therefore, with increase of the disparity, a distance to an object, that is, a depth is non-linearly varied.

The conversion unit 120 non-linearly converts the disparity of the input 3D image by considering the above characteristic so that the output 3D image signal has the depth linearly proportional to the input 3D image signal.

For example, the conversion unit 120, first, may calculate the disparity of the output 3D image signal using the following Equation.

$$T_2 = b\left(1 - \frac{f_2}{a} \cdot \frac{b - T_1}{bf_1}\right) \quad \text{(Equation 3)}$$

Here, "b" denotes a preset interocular distance of a user, "a" denotes a preset proportional constant between the depth information of the 3D image signal and the depth information of the output 3D image signal, $f_1$ denotes a preset first viewing distance to a screen of the other 3D display apparatus, $f_2$ denotes a preset second viewing distance to a screen of the 3D display apparatus, $T_1$ denotes the disparity of the 3D image signal, and $T_2$ denotes the disparity of the output 3D image signal.

The conversion unit 120 may calculate the depth information of the output 3D image signal by applying the calculated disparity of the output 3D image signal to the following Equation.

$$D_2 = \frac{bf_2}{b - T_2} \quad \text{(Equation 4)}$$

$D_2$ denotes a depth of the output 3D image signal output from a reception side 3D display apparatus.

As compared with a depth $D_1$ of a 3D image signal of a transmission side display apparatus, $D_2$ has a relationship.

$$D_2 = aSD_1 \quad \text{(Equation 5)}$$

As described above, "a" is a proportional constant between an input signal and an output signal. User may set an arbitrary value to adjust a 3D effect to their desired level. Alternatively, "a" may be set to a preset default value. When "a" may be read and set from data base in which a specific value optimized to the reception side 3D display apparatus or a specific value set corresponding to display sizes of the reception side and transmission side 3D display apparatuses, or the like is built.

When the transmitter information or information related to the input 3D image signal is not confirmed, the conversion unit 120 makes a linearly-proportional adjustment of the disparity of the input 3D image signal and generates the output 3D image signal. In this case, the conversion unit 120 may adjust the disparity of the 3D image signal again by referring to information for a preset guideline. That is, when the disparity exceeds the preset guideline, the conversion unit 120 may adjust the 3D effect according to the guideline, thereby enabling the 3D effect to be within the guideline.

The 3D effect may be adjusted by adjusting a disparity or depth information. The guideline is decided to reduce fatigue of eyes felt in watching a 3D display image and may be information for a maximum disparity between objects or a maximum depth.

The guideline may be set as various names such as a safety guideline, a safety range, and a tolerance.

Alternatively, if it is determined that the depth information, the disparity or the 3D effect decided by the depth information or the disparity deviates from the guideline even after the output 3D image signal of which the depth is adjusted using the above Equations, the conversion unit 120 may adjust the depth information or the disparity of the output 3D image signal according to the guideline to automatically convert the 3D effect.

In the above-described exemplary embodiments, although it has been described that the conversion unit 120 directly calculates the disparity or the depth information, the conversion unit 120 may not directly calculate the information every conversion and may calculate the information using a look-up table in which the information is previously calculated using the above-described Equations. That is, the disparity or the depth information at that time may be made in a look-up table by variously combining the transmitter information and the receiver information. At this condition, the conversion unit 120 may read a disparity or depth information corresponding to the input transmitter information from the look-up table and uses a read result.

Figure 5:
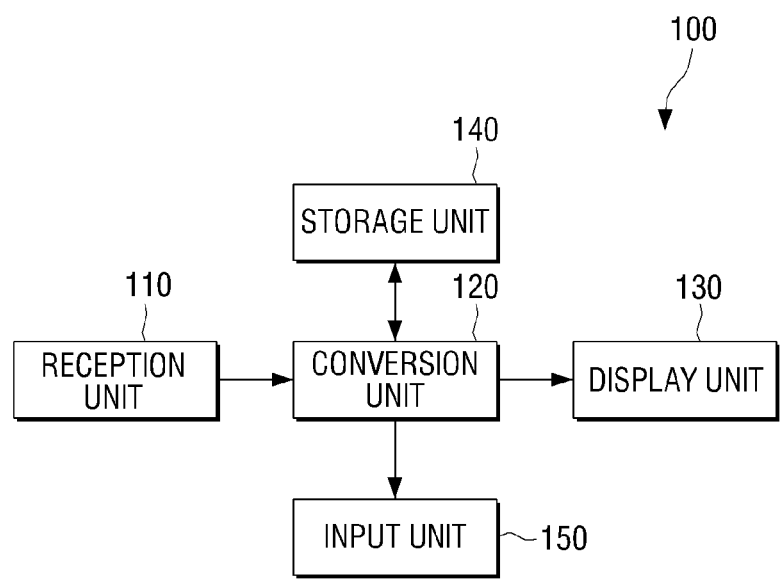
FIG. 5 is a block diagram illustrating a configuration of a 3D display apparatus according to various exemplary embodiments.

FIG. 5 is a block diagram illustrating a configuration of a 3D display apparatus according to exemplary embodiments. The 3D display apparatus of FIG. 5 include a reception unit 110, a conversion unit 120, a display unit 130, a storage unit 140, and an input unit 150.

The reception unit 110 receives a 3D image signal from another 3D display apparatus or the other external apparatuses, and the conversion unit 120 converts a disparity of the received 3D image signal and generates an output 3D image signal having depth information linearly converted.

The display unit 130 outputs a 3D image signal according to the generated output 3D image signal.

The storage unit 140 may store a variety of information according to exemplary embodiments. Specifically, the storage unit 140 may store a variety of information such as information for a guideline, information for a resolution, a display size, and a viewing distance matched according to each apparatus, or receiver information. The storage unit 140 may store all or a part of the above information according to exemplary embodiments. For example, the storage unit 140 may be implemented by a storage unit storing only the information for a guideline, a storage unit storing the characteristic information such as the resolution, the display size, or the viewing distance and the receiver information, or a storage unit storing all information. The storage unit 140 may not include only one memory, but the storage unit 140 may include various type memories such as a random access memory (RAM), a read only memory (ROM), a hard disc drive (HDD), a flash memory, a memory card, a universal serial bus (USB) memory and various numbers of memories.

The input unit 150 may receives a variety of information. The input unit 150 may be realized by a key pad or a touch screen embedded in the 3D display apparatus 100, a keyboard, a mouse, or various input devices connected to the 3D display apparatus 100, or a remote controller or a remote controller signal reception sensor separately provided. A user may input transmitter information, information for a reference apparatus for generation of the 3D image signal, signal characteristic information, and the like through the input unit 150.

As described above, the conversion unit 120 generates the output 3D image signal using the transmitter information and the receiver information. Here, the transmitter information may be provided in various manners.

As one example, the transmitter information may be included in the 3D image signal itself and transmitted. Specifically, when the 3D image signal is transmitted in a packet type, the transmitter information is included in a preset area and transmitted together with all or a part of a packet header or a pay loader. A recording position of the transmitter information, a format, a size, and the like may obey the prescribed protocol between the transmission side and reception side 3D display apparatuses. The protocol may be standardized. Therefore, when there is a standardized protocol, the conversion unit 120 may detect and use the transmitter information from the 3D image signal according to the protocol. Information stored in the storage unit 140 may used as the receiver information.

As another example, the transmitter information may be provided as additional information separately from the 3D image signal. That is, the other 3D display apparatus which transmits the 3D image signal may transmit the transmitter information separately from the 3D image signal or another external apparatus as a third apparatus may transmit the transmitter information for the other 3D display apparatus. The conversion unit 120 may receive the transmitter information through the various sources.

In the examples, the transmitter information may be a variety of information such as a kind, a product number, a product name, a resolution, a display size, or a viewing distance of the other 3D display apparatus. Here, when it is decided that only identification information such as a kind, a product number, a product name of the 3D display apparatus is transmitted, the conversion unit 120 may read and use characteristic information corresponding to the transmitted identification information, that is, a resolution, a display size, a viewing distance from the storage unit 140.

In another example, a user may direct input transmitter information through the input unit 150. That is, when the user direct inputs identification information such as a kind, a product number, a product name of the transmitter through the input unit 150, the conversion unit 120 may read information for a resolution, a display size, and a viewing distance corresponding to the identification information and the receiver information of the corresponding 3D display apparatus 100 itself and nonlinearly convert the disparity of the 3D image signal.

Specifically, the user connects the first 3D display apparatus and the second 3D display apparatus to each other, a user interface (UI) window which allows the user to input transmitter information as information for the transmission side apparatus may be output. Thereby, the user may directly input the transmitter information through the UI window or may input the transmitter information using the other input devices.

Therefore, the transmitter information may be provided in various types through various sources.

When the output 3D image signal has a large 3D effect enough that the depth information deviates from a preset guideline even after the output 3D image signal is generated, the conversion unit 120 may adjust the disparity or the depth information of the 3D image signal according to the guideline to automatically adjust the 3D effect.

Alternatively, when it is impossible to confirm the transmitter information, since it is difficult to generate an output 3D image signal using the above-described Equations, the conversion unit 120 adjusts the disparity or the depth information using the receiver information of the 3D display apparatus 100 to generate the output 3D image signal within the guideline range. Thereby, it may allow watching fatigue to be removed.

Figure 6:
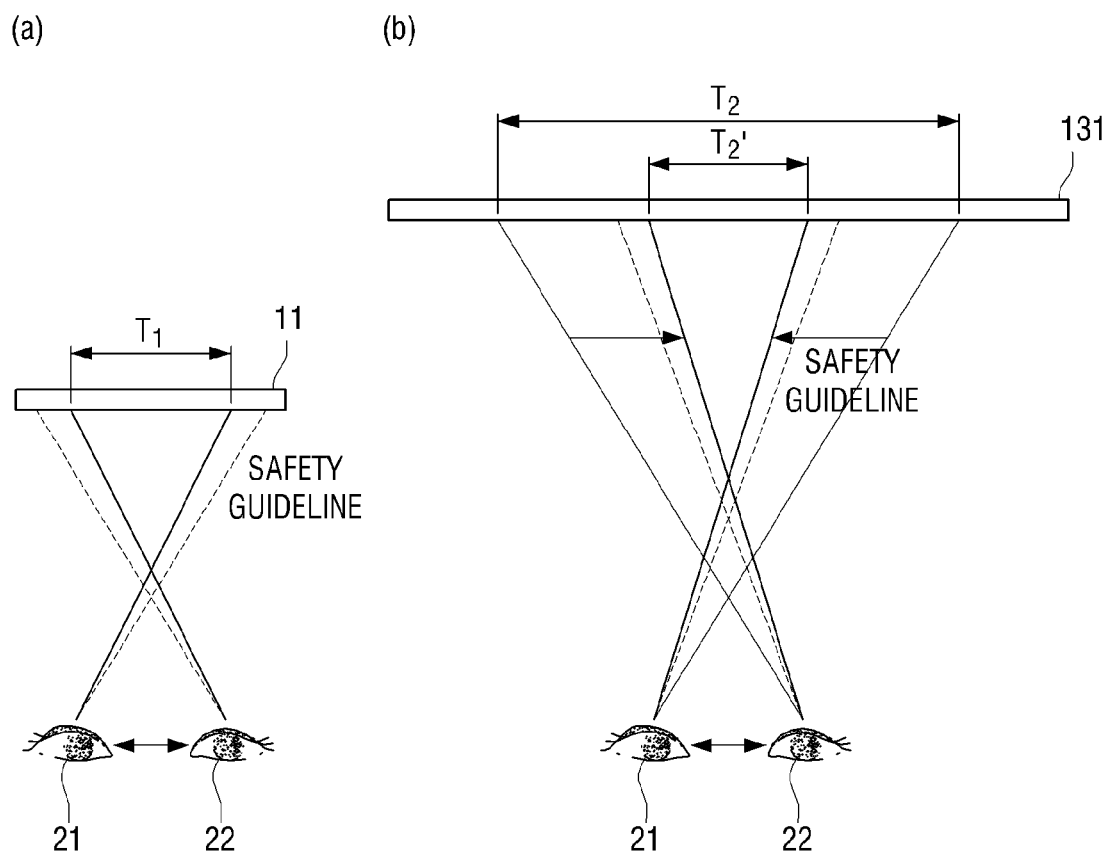
FIG. 6 is view illustrating a process of adjusting depth information according to a preset guideline.

FIG. 6 is a view explaining a process of adjusting a 3D effect according to the guideline.

When a large-size display screen 131 of FIG. 6(*b*) is watched by converting a 3D image signal being watched through a small-size display screen 11 of FIG. 6(*a*) to an output 3D image signal using the above-described method, a disparity of the converted output 3D image signal may deviate from the guideline like $T_2$. In this case, eyes fatigue due to an excessive 3D effect. Therefore, a process of adjusting the parity like $T_2'$ within the guideline range is performed. The disparity may be linearly adjusted according to the guideline. Therefore, the 3D effect may be adjusted by the disparity adjustment.

Figure 7:
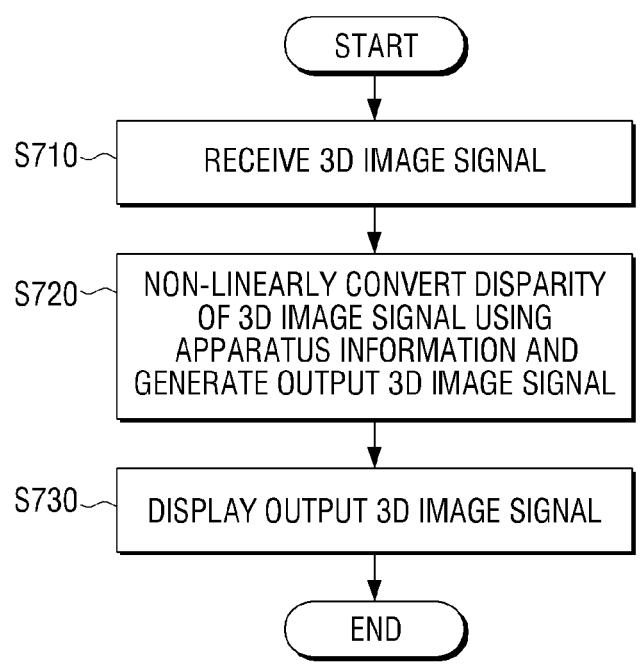

FIG. 7 is a flowchart illustrating a 3D display method of a 3D display apparatus according to an exemplary embodiment.

Referring to FIG. 7, when a 3D image signal is received (S710), the 3D display apparatus non-linearly converts a disparity of the 3D image signal using apparatus information such as transmitter information or receiver information and generates an output 3D image signal (S720). Depth information of the generated output 3D image signal has a linear-proportional relationship with the depth information of the received 3D image signal. Specifically, the depth information of the 3D image signal may be decided in a manner as the above-described Equations 3 to 5. Thereby, the 3D display apparatus outputs the generated output 3D image signal (S730).

FIG. 8 is a flowchart specifically illustrating a 3D display method of a 3D display apparatus according to an exemplary embodiment.

Referring to FIG. 8, when a 3D image signal is received (S810), the 3D display apparatus confirms transmitter information which is information for a standard apparatus for generation of the 3D image signal and receiver information (S820).

When the transmitter information is confirmed, the 3D display apparatus reads characteristic information matched to the confirmed transmitter information (S840), non-linearly converts a disparity of the disparity of the 3D image signal using the read characteristic information, and generates an output 3D image signal (S850).

On the other hand, when a user inputs transmitter information in the state that the transmitter information is not confirmed, the 3D display apparatus reads characteristic information corresponding to the input transmitter information (S840), non-linearly converts a disparity of the 3D image signal according to a read result, generates an output 3D image signal (S850).

Next, it is checked whether or not a 3D effect of the output 3D image signal is in a preset guideline (S860). As a checking result, the 3D effect is in the preset guideline, the 3D apparatus display outputs the output 3D image signal as it is (S880).

On the other hand, when the disparity deviates from the guideline, the 3D display apparatus adjust a 3D effect according to the guideline (S870) and output an output 3D image signal having the adjusted 3D effect (S880).

When it is impossible to confirm the transmitter information and the transmitter information is not input, the 3D display apparatus adjust a 3D effect according to the guideline (S870) and then outputs an output 3D image signal as it is (S880).

The above-described 3D display methods may be performed by the 3D display apparatuses illustrated in FIGS. 2 and 5 or other apparatuses having different configurations. Further, the contents described in FIGS. 2 to 6 may be used for descriptions of the 3D display methods according to various exemplary embodiments.

As described above, the transmitter information may be provided in various manners and fatigue of eyes may be removed or offset with maintaining an original 3D effect as much as possible using the transmitter information. Therefore, a user may effectively share the 3D image signal between 3D display apparatuses.

A program code for executing the above-described 3D display method may be stored on various type recording mediums. The program code may be recorded on terminal readable various recording mediums such as a RAM, a flash memory, a ROM, an erasable programmable ROM (EPROM), an electronically erasable and programmable ROM (EEPROM), a resister, a hard disc, a removable disc, a memory card, a USB memory, or a compact disc-ROM (CD-ROM). The term "unit" as used herein means a hardware component and/or a software component that is executed by a hardware component such as a processor.

Therefore, when the recording medium in which the program code is recorded is connected to or mounted on the 3D display apparatus, the 3D display method may be supported to the 3D display apparatus.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A three-dimensional (3D) display apparatus comprising:
   a reception unit which receives a 3D image signal from another 3D display apparatus;
   a conversion unit which converts a disparity of the 3D image signal based on transmitter information of the other 3D display apparatus and receiver information of the 3D display apparatus, and generates an output 3D image signal having depth information which is proportional to depth information of the 3D image signal; and
   a display unit which outputs the output 3D image signal.

2. The 3D display apparatus as claimed in claim 1, wherein the conversion unit calculates the disparity of the output 3D image signal according to a non-linear relationship between the depth information of the output 3D image signal and a viewing distance to a screen of the 3D display apparatus.

3. The 3D display apparatus as claimed in claim 1, wherein conversion unit non-linearly converts the disparity of the 3D image signal using transmitter information of the other 3D display apparatus and receiver information of the 3D display apparatus and generates the output 3D image signal having the depth information in linear-proportionality to the depth information of the 3D image signal.

4. The 3D display apparatus as claimed in claim 1, wherein the conversion unit detects the transmitter information from the 3D image signal.

5. The 3D display apparatus as claimed in claim 4, wherein the transmitter information comprises additional information transmitted from one of the other 3D display apparatus and an external apparatus.

6. The 3D display apparatus as claimed in claim 1, wherein the transmitter information comprises information for at least one of a kind, a product name, a resolution, a display size and a viewing distance of the other 3D display apparatus.

7. The 3D display apparatus as claimed in claim 1, further comprising:
an input unit which inputs the transmitter information; and
a storage unit which stores the receiver information and other information comprising information for a resolution, a display size and a viewing distance,
wherein the conversion unit reads from the storage unit the receiver information and the other information and converts the 3D image signal based on the receiver information and the other information read from the storage unit.

8. The 3D display apparatus as claimed in claim 1, further comprising a storage unit which stores information for a preset guideline,
wherein the conversion unit adjusts a 3D effect of the output 3D image signal according to the preset guideline if the depth information of the output 3D image signal deviates from the preset guideline.

9. The 3D display apparatus as claimed in claim 1, further comprising a storage unit which stores information for a preset guideline,
wherein the conversion unit adjusts a 3D effect of the 3D image signal according to the preset guideline and generates the output 3D image signal if the transmitter information of the other 3D display apparatus is not confirmed.

10. The 3D display apparatus as claimed in claim 1, wherein the conversion unit calculates a disparity of the output 3D image signal according to a first equation:

$$T_2 = b\left(1 - \frac{f_2}{a} \cdot \frac{b - T_1}{bf_1}\right),$$

and
wherein the conversion unit calculates the depth information $D_2$ of the output 3D image signal based on the calculated disparity of the output 3D image signal and according to a second equation:

$$D_2 = \frac{bf_2}{b - T_2},$$

and
wherein "b" denotes a preset interocular distance of a user, "a" denotes a preset proportionality constant between the depth information of the 3D image signal and the depth information of the output 3D image signal, "$f_1$" denotes a preset first viewing distance to a screen of the other 3D display apparatus, "$f_2$" denotes a preset second viewing distance to a screen of the 3D display apparatus, $T_1$ denotes the disparity of the 3D image signal, and $T_2$ denotes a disparity of the output 3D image signal.

11. The 3D display apparatus as claimed in claim 1, wherein the depth information of the output 3D image signal is denoted $D_2$,
wherein the conversion unit reads the depth information $D_2$ of the output 3D image signal from a look-up table,
wherein the depth information $D_2$ of the output 3D image signal is calculated according to equations:

$$T_2 = b\left(1 - \frac{f_2}{a} \cdot \frac{b - T_1}{bf_1}\right) \text{ and }$$

$$D_2 = \frac{bf_2}{b - T_2},$$

and generates the output 3D image signal based on the depth information $D_2$ read from the look-up table,
wherein, "b" denotes a preset interocular distance of a user, "a" denotes a preset proportionality constant between the depth information of the 3D image signal and the depth information of the output 3D image signal, $f_1$ denotes a preset first viewing distance to a screen of the other 3D display apparatus, $f_2$ denotes a preset second viewing distance to a screen of the 3D display apparatus, $T_1$ denotes the disparity of the 3D image signal, and $T_2$ denotes a disparity of the output 3D image signal.

12. A three-dimensional (3D) display method of controlling a 3D display apparatus, the method comprising:
receiving a 3D image signal from another 3D display apparatus;
converting a disparity of the 3D image signal using transmitter information of the other 3D display apparatus and receiver information of the 3D display apparatus;
generating an output 3D image signal having depth information proportional to depth information of the 3D image signal; and
outputting the output 3D image signal.

13. The method as claimed in claim 12, further comprising detecting the transmitter information from the 3D image signal.

14. The method as claimed in claim 12, wherein the transmitter information comprises additional information transmitted from one of the other 3D display apparatus and an external apparatus.

15. The method as claimed in claim 12, wherein the transmitter information comprises information for at least one of a kind, a product number, a product name, a resolution, a display size and a viewing distance of the other 3D display apparatus.

16. The method as claimed in claim 12, further comprising:
inputting the transmitter information; and
reading from a storage unit the receiver information and other information comprising information for a resolution, a display size, and a viewing distance matched to the input transmitter information,
wherein the generating of the output 3D image signal includes converting the disparity of the 3D image signal based on the receiver information and the other information read from the storage unit.

17. The method as claimed in claim 12, further comprising, when the depth information of the output 3D image signal deviates from a preset guideline, adjusting a 3D effect of the output 3D image signal according to the preset guideline.

18. The method as claimed in claim 15, further comprising, when the transmitter information of the other 3D display apparatus is not confirmed, adjusting a 3D effect of the 3D image signal according to the preset guideline.

19. The method as claimed in claim 12, wherein the generating of the output 3D image signal includes calculating the disparity of the output 3D image signal based on a first equation $$T_2 = b\left(1 - \frac{f_2}{a} \cdot \frac{b - T_1}{bf_1}\right)$$

and calculating the depth information $D_2$ of the output 3D image signal according to a second equation:

$$D_2 = \frac{bf_2}{b - T_2},$$

and wherein "b" denotes a preset interocular distance of a user, "a" denotes a preset proportionality constant between the depth information of the 3D image signal and the depth information of the output 3D image signal, $f_1$ denotes a preset first viewing distance to a screen of the other 3D display apparatus, $f_2$ denotes a preset second viewing distance to a screen of the 3D display apparatus, $T_1$ denotes the disparity of the 3D image signal, and $T_2$ denotes the disparity of the output 3D image signal.

20. The method as claimed in claim 12, wherein $D_2$ denotes the depth information of the output 3D image signal, wherein the generating of the output 3D image signal includes reading the depth information $D_2$ of the output 3D image signal from a look-up table, wherein the depth information $D_2$ of the output 3D image signal is calculated according to equations $$T_2 = b\left(1 - \frac{f_2}{a} \cdot \frac{b - T_1}{bf_1}\right) \text{ and}$$

$$D_2 = \frac{bf_2}{b - T_2},$$

and generating the output 3D image signal based on the depth information $D_2$ of the output 3D image signal read from the look-up table, wherein "b" denotes a preset interocular distance of a user, "a" denotes a preset proportionality constant between the depth information of the 3D image signal and the depth information of the output 3D image signal, f1 denotes a preset first viewing distance to a screen of the other 3D display apparatus, $f_2$ denotes a preset second viewing distance to a screen of the 3D display apparatus, $T_1$ denotes the disparity of the 3D image signal, and $T_2$ denotes the disparity of the output 3D image signal.

21. The method as claimed in claim 12, further comprising calculating the disparity of the output 3D image signal according to a non-linear relationship between the depth information of the output 3D image signal and a viewing distance to a screen of the 3D display apparatus.

22. The method as claimed in claim 12, wherein the converting the disparity of the 3D image signal comprises non-linearly converting the disparity of the 3D image signal using the transmitter information of the other 3D display apparatus and the receiver information of the 3D display apparatus, and wherein the generating the output 3D image signal comprises generating the output 3D image signal having depth information in linear-proportionality to the depth information of the 3D image signal.

* * * * *